United States Patent [19]
Bennett et al.

[11] Patent Number: 5,583,192
[45] Date of Patent: Dec. 10, 1996

[54] FLEXIBLE CYCLOOLEFIN COPOLYMER FILM AND METHOD OF PREPARING SAME

[75] Inventors: Cynthia Bennett, Alzey; Michael-Joachim Brekner, Frankfurt am Main; Otto Herrmann-Schoenherr, Bensheim; Frank Osan, Kelkheim, all of Germany

[73] Assignee: Hoechst Aktiengesellschaft, Frankfurt am Main, Germany

[21] Appl. No.: 195,078

[22] Filed: Feb. 14, 1994

[30] Foreign Application Priority Data

Feb. 12, 1993 [DE] Germany ............... 43 04 309.7

[51] Int. Cl.⁶ ............... B23B 27/32; C08L 45/00; C08K 3/00
[52] U.S. Cl. ............... 526/348.1; 526/127; 526/160; 526/281; 526/282; 524/553; 524/554; 264/1.6; 264/331.17; 428/910
[58] Field of Search ............... 526/281, 282, 526/160, 308, 348.1, 127, 170, 283; 524/553, 554; 428/910; 264/1.6, 331.17

[56] References Cited

U.S. PATENT DOCUMENTS

| | | | |
|---|---|---|---|
| 5,087,677 | 2/1992 | Brekner et al. | 526/160 |
| 5,371,158 | 12/1994 | Brekner et al. | 526/127 |
| 5,422,409 | 6/1995 | Brekner et al. | 526/281 |

FOREIGN PATENT DOCUMENTS

| | | |
|---|---|---|
| 0384694 | 8/1990 | European Pat. Off. . |
| 0407870 | 1/1991 | European Pat. Off. . |
| 0485893 | 5/1992 | European Pat. Off. . |
| 0501370 | 9/1992 | European Pat. Off. . |
| 0503422 | 9/1992 | European Pat. Off. . |
| 0530767 | 3/1993 | European Pat. Off. . |
| 224538 | 7/1985 | Germany . |
| 241971 | 1/1987 | Germany . |
| 0504418 | 9/1992 | Japan . |

OTHER PUBLICATIONS

J. L. Throne, Plastics Process Engineering, Marcel Dekker, Inc., N.Y. 442–3 (1979).

S. S. Schwartz et al., Plastics Materials and Processes, Van Nostrand Reinhold Co., N.Y., 592, 594 (1982).

Christoph Fritzsche, Torsions–schwingungsmessungen an Kunstastoffen, (Torsion Vibration Measurments on Plastics), vol. 21, No. 2, pp. 3–10, (1974).

*Primary Examiner*—Fred Teskin
*Attorney, Agent, or Firm*—Foley & Lardner

[57] ABSTRACT

A flexible single- or multilayer non-oriented or mono- or biaxially oriented film in which at least one layer comprises a cycloolefin copolymer, wherein the cycloolefin copolymer has a mechanical loss factor (tan $\delta$) of $\geq 0.015$ at 50° C. below the glass transition temperature.

20 Claims, 5 Drawing Sheets

FLEXIBLE CYCLOOLEFIN COPOLYMER FILM AND METHOD OF PREPARING SAME

BACKGROUND OF THE INVENTION

1. Field of the Invention

The invention relates to flexible films of cycloolefin copolymers, a process for the production of such films and their use as capacitor dielectrics, thermoformed materials, packaging materials and electrical insulation.

2. Description of Related Art

Cycloolefin copolymers have the following properties that are advantageous specifically for films:

high transparency (for optical uses)

good dielectric properties (as a capacitor dielectric)

high softening points, in particular, at a high cycloolefin content (for high temperature uses) and good gas barriers (for uses in the packaging sector).

Films prepared from cycloolefin copolymers are known. DD-A 224 538 and DD-A 241 971 describe cast films of ethylenenorbornene copolymers. EP-A 0 384 694 also describes films of cyclic copolymers. Except for the norbornene copolymers, other cycloolefinic starting materials mentioned therein are comparatively expensive and therefore uneconomical.

One disadvantage of many of the known cycloolefin copolymer films is the high brittleness. Films having high brittleness are difficult to handle since these films break easily during winding up and unwinding. This problem is exacerbated for the exceptionally thin films for capacitor dielectrics where the capacity of the capacitor is inversely proportional to the square of the film thickness. Extremely thin films prepared from the known cycloolefin copolymers can not be handled appropriately for the aforementioned uses.

Some cycloolefin copolymers that may be suitable for the production of the films according to the invention are described in EP-A 0 407 870, EP-A-0 503 422 and in DE-A 40 36 264 the disclosures of which are incorporated by reference herein. These documents also mention that films can be produced from these raw materials. These documents also include, however, many cycloolefin copolymers that are not suitable for the production of films according to the invention since they are too brittle and therefore do not have an adequate flexibility. Cycloolefin copolymers having a specific microstructure typically are needed to prepare films having the requisite thickness and flexibility. Suitable mechanisms for preparing cycloolefin copolymers having this specific microstructure described below, however, are not described in these documents.

SUMMARY OF THE INVENTION

It is an object of the present invention to produce more flexible cycloolefin copolymer films which are easier to handle as extremely thin films and are suitable, for example, for use as a capacitor dielectric. It also is an object of the invention to utilize cycloolefin copolymer films for less brittle thermoformed components, e.g., for the production of packaging that can be filled when hot or shaped electrical insulations.

In accordance with these objectives, there is provided cycloolefin copolymers having a specific microstructure that permit the production of oriented cycloolefin copolymer films having a particularly high flexibility. In accordance with nuclear magnetic resonance analysis, this microstructure is tactic with respect to the microstructure of the blocks in the polymer chain. The type of tacticity is unknown. The specific microstructure of these cycloolefin copolymers, however, is characterized by a relatively high isotacticity with respect to the conventional cycloolefins. This microstructure further results in a relatively high entanglement density and permits mechanical relaxation, which manifests itself macroscopically in a reduction in brittleness i.e., higher ductility. Mechanical energy therefore can be distributed over larger volumes, and the material does not tear as rapidly as conventional cycloolefin films.

This improved flexibility with respect to known cycloolefin polymeric films is due primarily to an improved ductility of the cycloolefin copolymer and, consequently, an improved ductility of the film. Cycloolefin copolymers are suitable for production of films according to the invention when these polymers display secondary softening below the glass transition temperature ($T_g$) of the copolymer, so that the mechanical loss factor (tan $\delta$) of the film at 50° C. below the glass transition temperature is at least 0.015. This mechanical loss factor tan $\delta$ value serves as evidence of the requisite microstructure of the cycloolefin copolymers of the present invention.

In accordance with another aspect of this invention, there is provided a film having at least one layer comprising a cycloolefin copolymer wherein the $^{13}$C-NMR spectrum of the copolymer has a characteristic peak at 42.2 ppm, in addition to other differences.

In accordance with an additional embodiment of the invention, there is provided a capacitor dielectric, electrical insulation, a packaging film, a reproduction film, a thermoformed component or a display window for LED containing cycloolefin copolymers meeting the aforementioned condition.

In accordance with an additional object of the invention, there is provided a method of making a film having the above mechanical loss factor comprising polymerizing a cycloolefin and olefin in the presence of a metallocene catalyst, separating the cycloolefin copolymer and forming a film from the copolymer.

These and other objects of the invention will become readily apparent to those skilled in the art upon review of the detailed discussion of preferred embodiments that follows.

DETAILED DESCRIPTION

Figure 1:
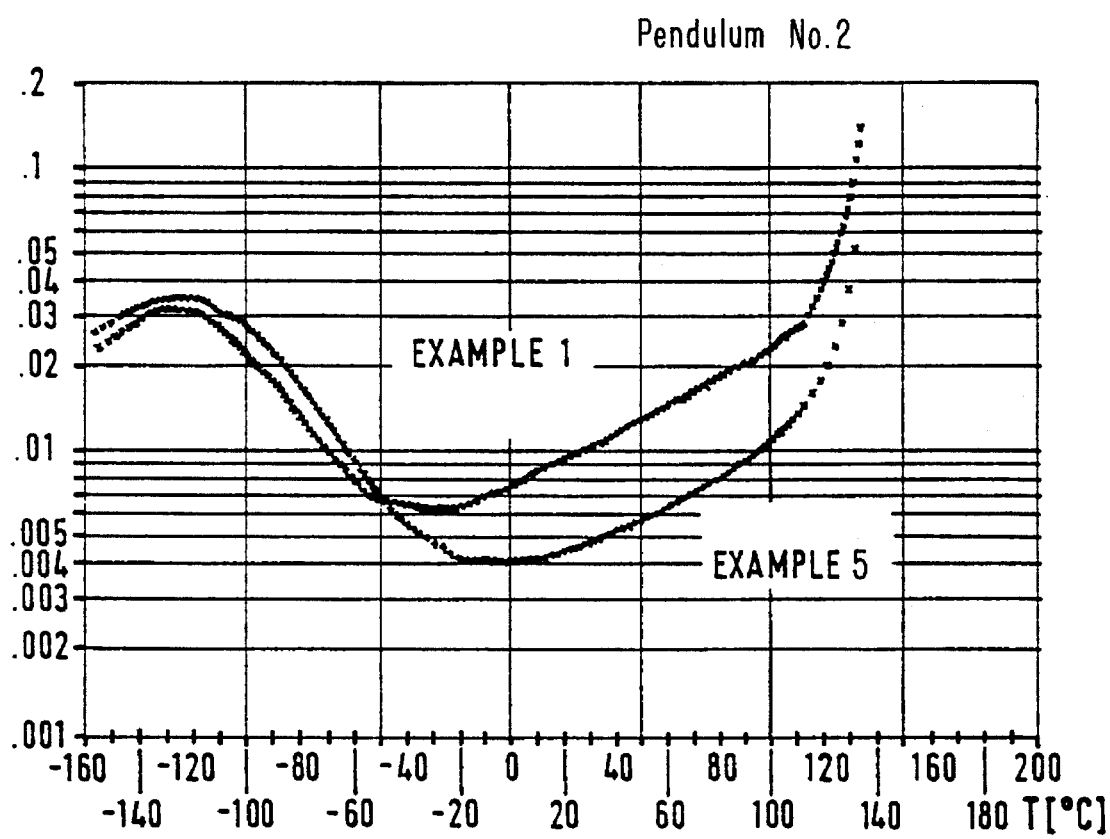
FIG. 1 illustrates the relationship between the mechanical loss factor (tan $\delta$) and temperature for Examples 1 and 5.

Throughout this description, "adequate flexibility" or "flexibility" means that the film withstands flexural stress, in particular repeated flexural stresses, without fracture. Films according to the present invention having thicknesses of about 100 μm withstand bending at least 50 times, preferably at least 100 to 200 times.

The films according to the invention comprise at least one layer comprising a cycloolefin copolymer such that the mechanical loss factor (tan δ) of the film at 50° C. below the glass transition temperature is at least 0.015. Preferably at least one layer is built up primarily, i.e., to the extent of at least 50%, preferably at least 90% by weight, and more preferably at least 95% by weight, (based on the weight of the layer), of a cycloolefin copolymer comprising the recurring units (I) and (II)

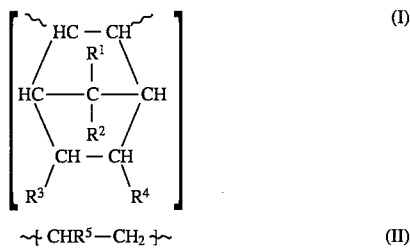

The films of the present invent ion may further comprise a cycloolefin copolymer additionally having recurring units (III) and/or (IV) and/or (V)

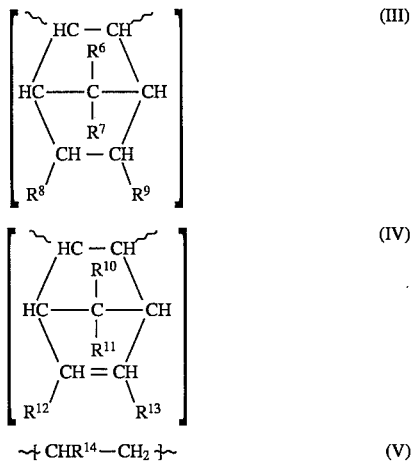

in which (III) is not identical to (I), $R^1$ to $R^5$ are the same or different and may be H, aryl, $C_1$–$C_{10}$-alkyl or $C_3$–$C_{10}$-cycloalkyl and in which $R^6$ to $R^{14}$ are the same or different and may have the meaning of $R^1$ to $R^5$, or may be $C_2$–$C_{10}$-alkylene or $C_3$–$C_{10}$-cycloalkenyl, and in which the radical pairs $R^6/R^7$, $R^8/R^9$, $R^{10}/R^{11}$ and/or $R^{12}/R^{13}$ in each case may be bonded to one another and, together with the carbon atoms to which they are bonded, may be a $C_4$–$C_{10}$-cycloalkyl or $C_4$–$C_{10}$-cycloalkenyl radical, which in turn may be bridged by a —$C(R^1,R^2)$-radical, in which $R^1$ and $R^2$ have the meanings given above for $R^1$ to $R^5$.

In a preferred embodiment of the invention, $R^1$, $R^2$, $R^3$, $R^4$ and $R^5$ are H.

In an additional embodiment of the present invention, monomers that contain at least two double bonds, i.e., at least one of the radicals $R^6$ to $R^{14}$ is unsaturated, can be used. Long chain branching, by incorporation of a side chain via the second double bond of the diene monomer, can be effected by suitable choice of the polymerization conditions (for example a sufficiently long reaction time to achieve a high conversion). Such polymers are particularly suitable for the production of blown films. On the other hand, if the polymerization conditions are chosen such that unreacted double bonds remain in the polymer, i.e., one or more of $R^6$ to $R^{14}$ are unsaturated, these double bonds can be utilized for subsequent branchings or for crosslinking. Such crosslinking is useful for fixing the dimension of the film or of the thermoformed component, or for chemical modification.

The content of recurring units of the formula (I) in the cycloolefin copolymer may be 5–95 mol%, preferably 20–70 mol%. The content of recurring units of the formula (II) in the cycloolefin copolymer may be 95–5 mol%, preferably 30–80 mol%. The recurring unit of the formula (III) is optionally present and can be present in the polymer in an amount of 0–5 mol%, preferably 0–3 mol%. The recurring unit of the formula (IV) likewise is optionally present and can be present in the polymer in an amount of 0–5 mol% preferably 0–3 mol% The recurring unit of the formula (V) likewise is optionally present and can be contained in the polymer in an amount of 0–5 mol%, preferably 0–3 mol%. All the above-mentioned mol% data relate to the weight of the cycloolefin copolymer employed. The sum of all of the contents of the recurring units in mol% (I), (II), (III), (IV) and (V) is 100 mol%.

The molar contents of the structures (I), (II), (III), (IV) and (V) influence the glass transition temperature ($T_g$) of the resulting cycloolefin copolymers. In copolymers which comprise exclusively the recurring units of the formulae (I) and (II), in which (II) is ethylene, a molar content of 25 mol% of (I) leads to a $T_g$ of about 50° C.; a molar content of 65% by weight of (I) leads to a $T_g$ of about 200° C. Other monomer compositions have similar properties, i.e., higher molar contents of recurring units of the formula,(I) lead to higher glass transition temperatures. Upon review of the present specification, varying the amounts of recurring units (I) to (V) to affect the $T_g$ is within the mounding skill of those skilled in the art.

Glass transition temperatures of 50°–250° C., in particular 80°–200° C., are particularly preferred for the rigid films according to the invention.

Some selected bridged metallocene catalyst systems, such as those described in DE-A 40 36 264 and EP-A 0 407 870, can be used for the preparation of the cycloolefin copolymers of the present invention. The choice of catalyst and of the polymerization conditions should be selected carefully to achieve the microstructure according to the invention. Methylaluminoxane/rac-dimethylsilyl-bis-(1-indenyl)-zirconium dichloride or methylaluminoxane/isopropylene(cyclopentadienyl)-(1-indenyl)-zirconium dichloride systems have proved to be suitable. However, other catalysts are also suitable for preparation of the polymers, as long as the microstructure according to the invention is obtained. An example of a catalyst which does not lead to the desired microstructure is diphenylmethylene-(cyclopentadienyl)-(9-fluorenyl)-zirconium dichloride. The cycloolefin copolymers are expediently prepared by the process described in DE-A 40 36 264. Those skilled in the art are capable of utilizing the methods described therein to prepare cycloolefin copolymers of the present invention upon review of the present specification and the procedures outlined therein.

The cycloolefin copolymers of the invention can be prepared by introducing the cycloolefin and the olefin into a polymerization reactor, adding a dissolved or suspended catalyst system and then bringing the mixture to the reaction temperature. The incorporation ratio of the monomers in the polymer and therefore the glass transition temperature of the polymer can be controlled by suitable choice of the reaction temperature. The pressure of the usually gaseous olefin typically is expediently kept constant during the polymerization in order to achieve a uniform incorporation rate. When the reaction has ended, the catalyst is deactivated, for example by addition of an alcohol, and separated from the polymer. The skilled artisan is capable of varying reaction conditions to synthesize a copolymer meeting the limitations of the present invention.

The microstructure of the cycloolefin copolymers of the present invention can be demonstrated either via the temperature relationship with the mechanical loss factor (tan δ) or by means of the $^{13}$C-NMR spectrum. The temperature relationship with the mechanical loss factor (tan δ) provides information on mechanical relaxation processes, i.e., principal softenings (glass transitions) and secondary softenings. The mechanical loss factor (tan δ) can be determined by a number of known oscillation methods, for example, torsion pendulum or alternating load studies (cf. Ch. Fritzsche, "Torsions-schwingungsmessungen an Kunststoffen (Torsion vibration measurements on plastics) in Kunststoffe—Plastics, volume 21, issue No. 2, (1974) pages 17–24). Those skilled in the art are capable of measuring the mechanical loss factor (tan δ) in accordance with the techniques described therein.

Measurement of the dielectric loss factor usually is less conclusive on polyolefins for determining mechanical relaxations, since the polarity of these polyolefins typically is too low. The oscillation methods for determining the mechanical loss factor mentioned above should be conducted on non-oriented specimens. If the specimens are oriented, they must be isotropized before the study, i.e., their orientation must be eliminated. This isotropization can be effected, for example, by heat treating the films for at least 30 minutes at a temperature about 20° C. above the $T_g$ of the cycloolefin copolymer. As an alternative to heat treatment of film specimens, non-oriented injection-molded bars also can be produced from the polymer and can be used as measurement specimens. If a film specimen comprises other layers or additives in amounts of greater than 2% by weight, the $^{13}$C-NMR spectra should be measured instead of the mechanical loss factor (tan δ).

Figure 2:
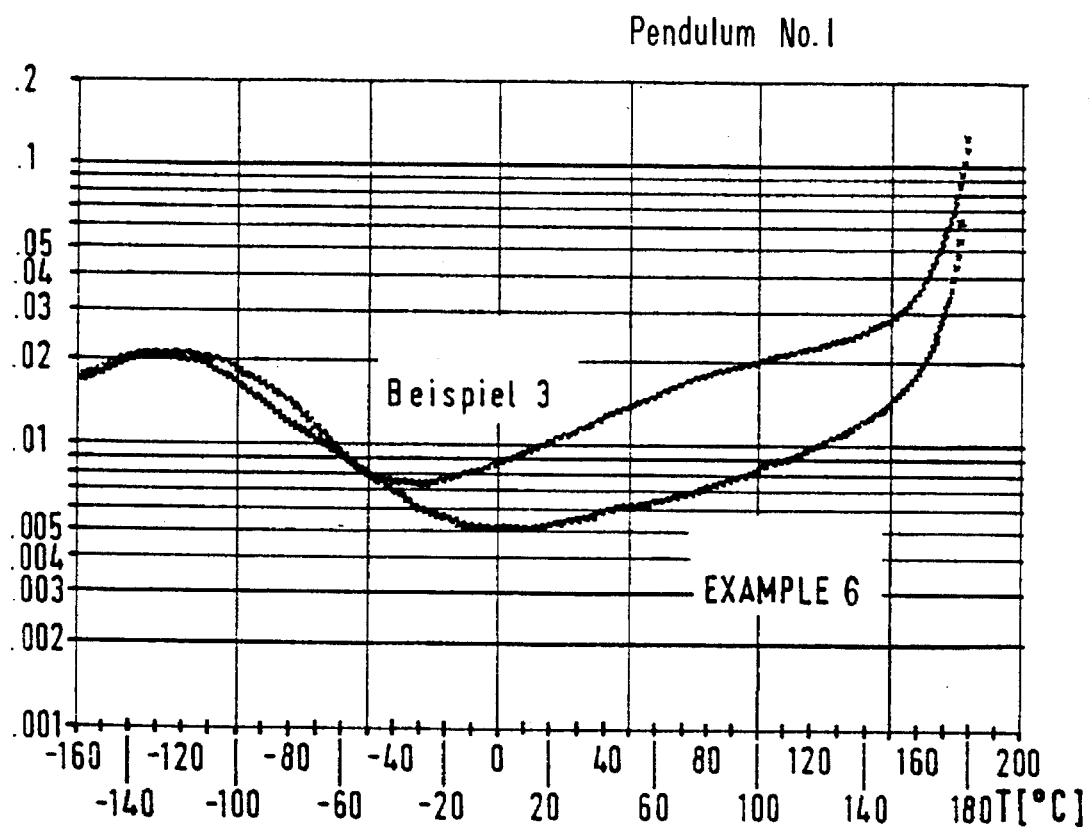
FIG. 2 illustrates the relationship between the mechanical loss factor (tan $\delta$) and temperature for Examples 3 and 6.
Figure 3:
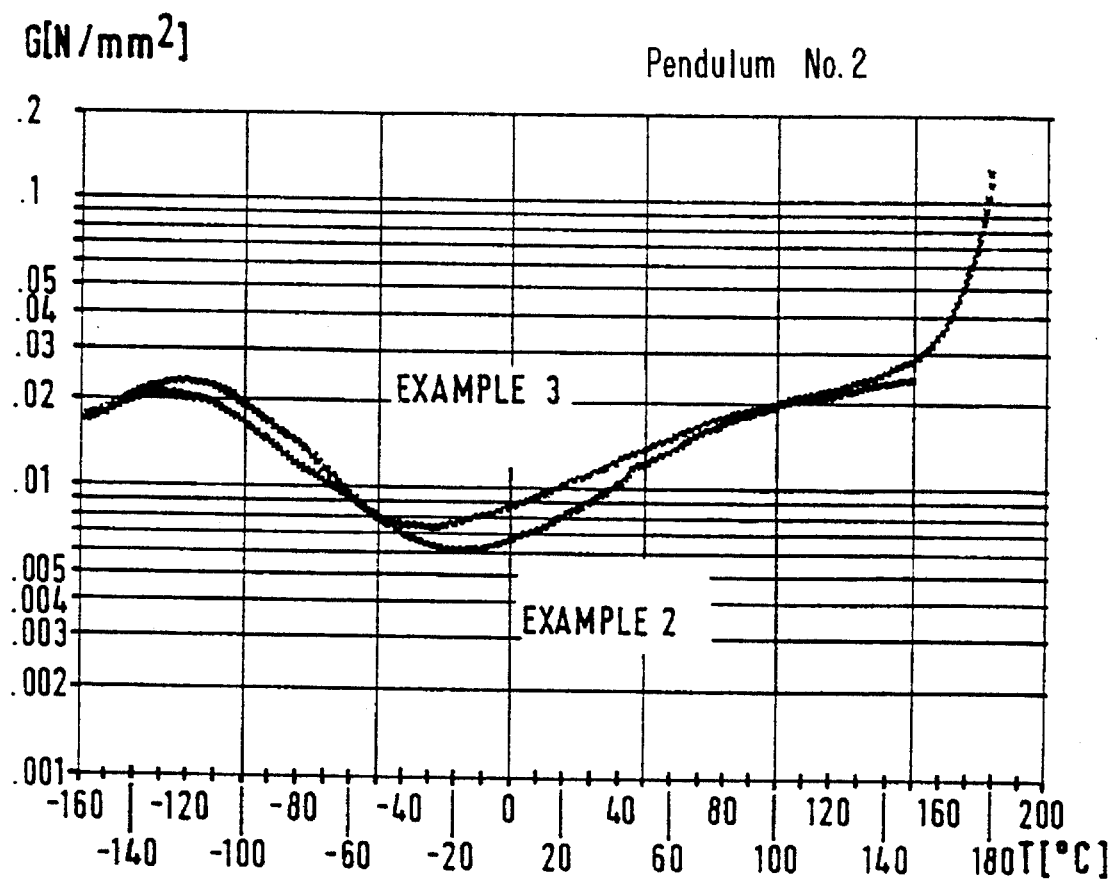
FIG. 3 illustrates the relationship between the mechanical loss factor (tan $\delta$) and temperature for Examples 2 and 3.

The relationship of the temperature and the mechanical loss factor (tan δ) of polymers with and without the specific microstructure of the invention is illustrated in FIGS. 1, 2 and 3. The polymers having the specific microstructure have higher values in the range between the glass transition temperature to below 0° C., i.e. the specimens having the specific microstructure of the present invention have an improved ductility in this temperature range. It is a distinct characteristic of the polymers having the specific microstructure of the invention that the mechanical loss factor (tan δ) has values of greater than 0.015, preferably greater than 0,018, at a temperature 50° C. below the glass transition temperature. Values of greater than 0.1 typically are not realistic.

Because of their increased ductility, the films according to the invention have increased flexibility and/or elongation at break. It has been known that the flexibility and elongation at break of films can be increased by orientation. An oriented film which does not contain cycloolefin copolymers of the present invention may possibly exhibit a higher flexibility and/or elongation at break than a less oriented film containing cycloolefin copolymers of the invention. When films of the same thickness, same degree of orientation, same molar composition and same $T_g$ are compared with one another, however, the films of the present invention will have a higher flexibility and elongation at break than a conventional cycloolefin copolymer film.

Figure 4:
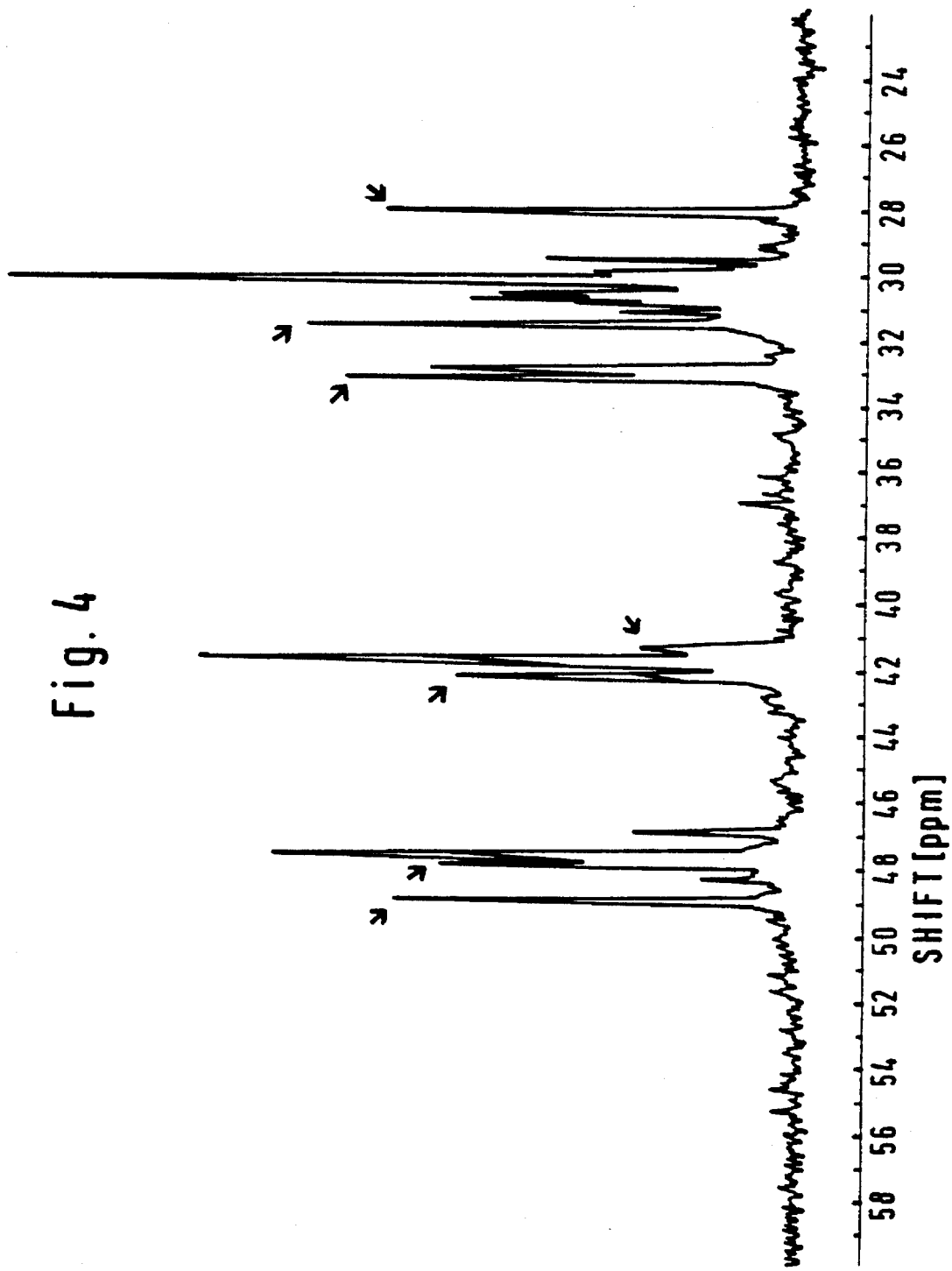
FIG. 4 illustrates a $^{13}$C-NMR spectrum for a cycloolefin copolymer of the present invention.
Figure 5:
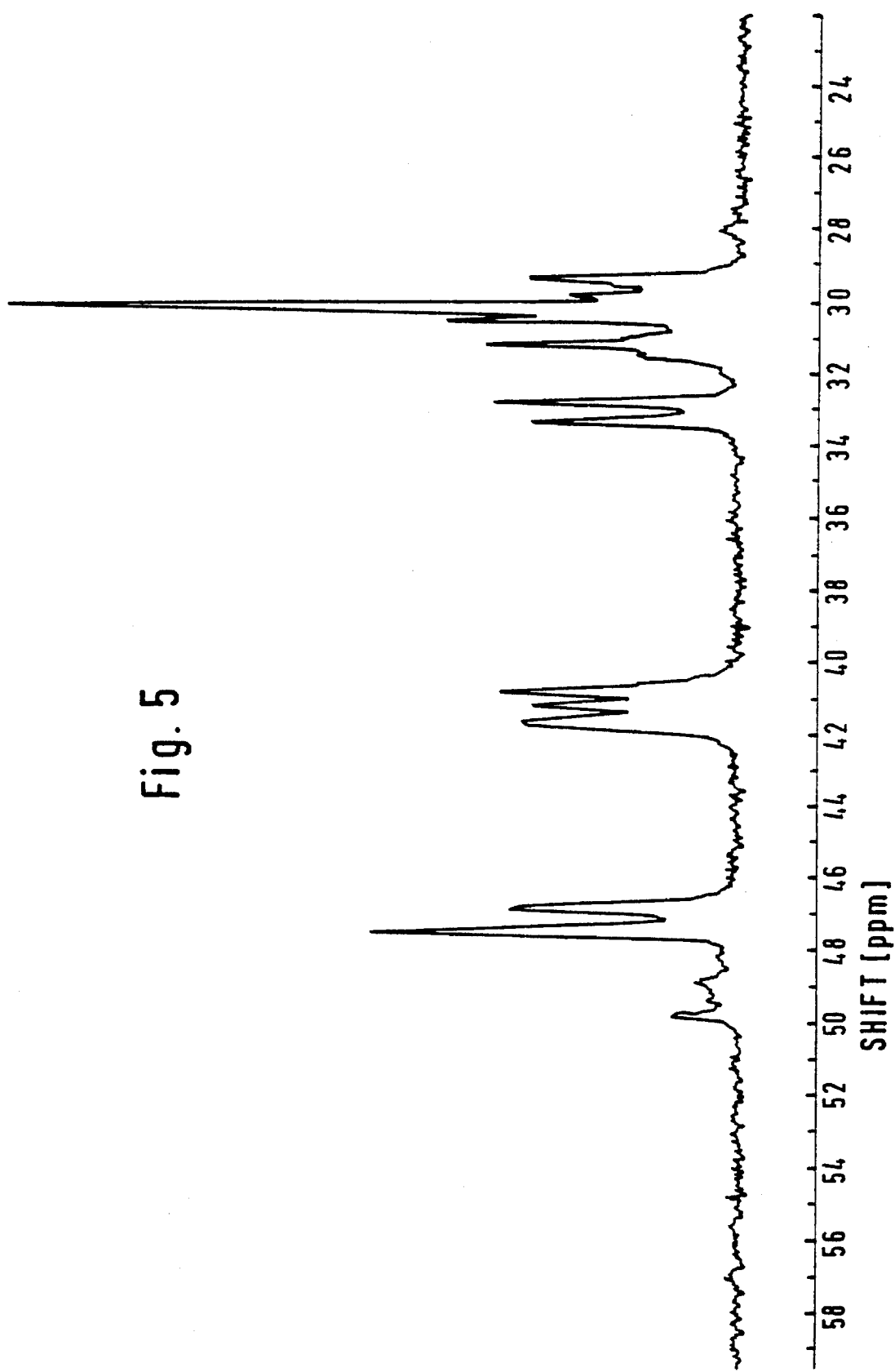
FIG. 5 illustrates a $^{13}$C-NMR spectrum for a conventional cycloolefin copolymer.

The microstructure of the cycloolefin copolymers of the invention causes characteristic peaks in the $^{13}$C-NMR spectrum. FIG. 4 illustrates a typical spectrum of cycloolefin copolymers having the microstructure according to the invention. FIG. 5 illustrates, for comparison, a spectrum of a cycloolefin copolymer without the microstructure according to the invention. The spectra of FIGS. 4 and 5 show some common peaks and differences, the differences most likely attribute to a different steric build-up of the polymers ("tactility"). The specific microstructure of cycloolefin copolymers of the invention results in the following common characteristic peaks:

| Common Peaks (ppm) | Characteristic Peaks (ppm) |
|---|---|
| 47.5 | 48.8 |
| 46.8 | 47.7 |
| 41.7 | 42.4 |
|  | 41.3 |
| 32.8 | 33.1 |
| 30.1 | 31.5 |
|  | 28.0 |

Since the position of the individual peaks can vary somewhat as a function of the recording conditions of the spectra, the peaks that are common in all of the spectra can serve as reference points. The heights of the particular peaks vary according to the monomer composition, but the positions are characteristic. The peaks at 28.0, 31.5, 33.1, 41.3, 42.2, 47.7 and 48.8 ppm are unambiguous for the microstructure according to the invention. (The peaks mentioned are characteristic of the specific microstructure, but the spectra as a rule also contain other peaks). Additives or impurities can lead to additional peaks in a spectrum. Spectra of the polymers to be employed according to the invention, therefore, also can contain additional peaks.

One advantage of the present invention is that cycloolefin copolymers having the above mentioned microstructure result in more flexible films, for a given degree of orientation, than corresponding films of cycloolefin copolymers having a different microstructure or no microstructure.

In an additional embodiment of the invention, the film may comprise fine inert particles which improve the slip and winding properties. Such particles, which they can comprise in effective amounts, generally of 0–1%, include for example $SiO_2$, $Al_2O_3$, silicates having an $SiO_2$ content of at least 30% by weight, amorphous and crystalline alumina minerals, aluminosilicates, oxides of Mg, Zn, Zr and Ti, sulfates of Ca, Mg and Ba, phosphates of Li, Na and Ca (including the monohydrogen salts and dihydrogen salts thereof), benzoates of Li, Na and K, terephthalates of Ca, Ba, Zn and Mn, titanates of Mg, Ca, Ba, Zn, Cd, Pb, Sr, Mn, Fe, Co and Ni, chromates of Ba and Pb, carbon (for example carbon black or graphite), glass (glass powder and glass beads), carbonates of Ca and Mg, fluorspar, sulfides of Zn and Mo, organic polymer substances, such as polytetrafluoroethylene/polyethylene, talc, lithium fluoride and the Ca, Ba, Zn and Mn salts of organic acids.

The films of the present invention also may comprise suitable additives including, for example, stabilizers, lubricants or antioxidants. Useful additives for polyolefins such as polyethylene or polypropylene also are suitable for the cycloolefin copolymer films. Useful UV stabilizers include, for example, absorbers, such as hydroxyphenylbenzotriazoles, hydroxybenzophenones, formamidine or benzylidenecamphor, quenching agents, such as cinnamic acid esters or nickel chelates, agents which trap free radicals, such as sterically hindered phenols, hydroperoxide-destroying agents, such as nickel complexes or zinc complexes of sulfur-containing compounds, or light stabilizers of the HALS type, and mixtures thereof. Useful lubricants include, for example, fatty acids and esters, amides and salts thereof, silicones or waxes, such as PP waxes or PE waxes. Antioxidants that can be added include, for example, agents which trap free radicals, such as substituted phenols and aromatic amines, and/or peroxide destroying agents, such as phosphites, phosphonates and thio compounds.

The film according to the present invention also can be a single- or multilayer film. At least one layer comprises mainly, i.e., to the extent of at least 50% by weight, preferably at least 85% by weight, and more preferably to the extent of 90–100% by weight, the cycloolefin copolymers described above. The monofilm is a preferred embodiment.

In an additional embodiment of the invention, the main layer according to the invention carries one or two thin polymer top layers having lower glass transition temperatures than the main layer, preferably at least 20° lower. Cycloolefin copolymers are as preferably used in the top layer, but these top layers do not necessarily have the specific microstructure of the cycloolefin copolymers used in the main layer.

The film can be coated for modification of its properties.

The film according to the invention can comprise other compatible or non-compatible polymers to improve its properties. These polymers can form separate layers or be mixed with the cycloolefin copolymer. Examples of such polymers include polyethylene, polypropylene, polymethylbut-1-ene, poly(4-methylpent-1-ene), polybut-1-ene and polystyrene, polyvinyl chloride, polyvinylidene chloride, polyvinyl fluoride, polytetrafluoroethylene, polychloroprene, polyacrylate, polymethacrylate, polyacrylamide, polyacrylonitrile, acrylonitrile/butadiene/styrene copolymers, acrylonitrile/styrene copolymers and acrylonitrile/styrene/acrylate copolymers, polyvinyl alcohol, polyvinyl acetate, polyvinyl stearate, polyvinyl benzoate, polyvinyl maleate, polyvinylbutyral, polyallyl phthalate, polyallyl melamine, copolymers of the above-mentioned monomers, such as ethylene/vinyl acetate copolymer, polyethylene oxide and polymers of bis-glycidyl ethers, polyoxymethylene, polyoxyethylene and polyoxymethylene/ethylene oxide copolymers, polyphenyl oxide polymers, polycarbonates, polysulfones, polyurethanes, nylon 6, nylon 66, nylon 11 and nylon 12, polyethylene terephthalate, polybutylene terephthalate and poly-1,4-dimethylolcyclohexane terephthalate, polyethylene naphthalate, polyethylene naphthalate bibenzoate, phenol-formaldehyde resins and melamine-formaldehyde resins, cellulose, cellulose propionates and cellulose ethers and proteins.

The films can be produced by various processes. Casting from solution is possible, but thermoplastic processing generally is more efficacious. Pressing of sheets is particularly suitable for experimental use, but continuous processes, such as extrusion or calendering, are more economical for industrial production.

Extruded films can be shaped as a tube or flat film. Coextrusion is advisable for the production of multilayer films. Those skilled in the art are familiar with those film-forming techniques.

The films often are oriented for improving the mechanical properties further. This is effected by stretching. The stretching temperatures should expediently be in a temperature range from 40° C. below the glass transition temperature ($T_g$−40° C.) to 50° C. above the glass transition temperature ($T_g$+50° C.). Thus, the stretching temperature should satisfy the following relation: ($T_g$−40° C.)≦$T_s$≦($T_g$+50° C.). The orientation can be uniaxial or biaxial.

Stretching temperatures above the $T_g$ are suitable for industrial production because this allows faster production because of the higher stretching speeds which can be achieved. The temperature, stretching rate and stretching ratios should be coordinated with one another such that the film does not tear. The stretching speed preferably is 1–500,000%/minute. The stretching ratios in the longitudinal and transverse directions are in each case 1.1:1–10:1, preferably 1.5:1–4:1. The area stretching ratio should preferably be 3–20.

If stretching is carried out above $T_g$, the stretched film should rapidly be cooled to below $T_g$ after stretching has taken place. Otherwise, there is the risk that the orientation is lost by relaxation. This process measure is more critical with amorphous cycloolefin copolymers than with flexible polymers.

In the case of biaxial orientation, the stretching can be carried out simultaneously or sequentially. Tenter processes are suitable for flat films, as well as simultaneous stretching frames. Tubular films typically are oriented biaxially by inflation with simultaneous longitudinal take-off.

Oriented amorphous films can be employed as shrink films. Non-oriented or only slightly oriented films find use for the production of thermoformed components.

The surfaces of the films can be modified to achieve, for example, adhesion promotion or printability or antistatic or antiadhesion properties. This modification can be effected either by treatment methods such as corona, flame, plasma or oxidation treatment, or by application of a coating from a solution or dispersion.

The films of the present invention also find use as a capacitor dielectric, electrical insulation, a packaging film, a reproduction film or as a display window for LED cells. Those skilled in the art recognize how to use polymer films for the above-mentioned purposes.

The invention will be illustrated in more detail in the following with the aid of non-limiting examples.

EXAMPLES

The following analytical methods were used in the examples which follow. Those skilled in the art are familiar with the following techniques and are capable of measuring the following characteristics using these techniques.

The glass transition temperature ($T_g$) was determined as the sudden increase in thermal capacity in the DSC diagram. The DSC diagrams were recorded using a Perkin-Elmer DSC 7.

The viscosity number (VN) was determined in accordance with DIN 53 728 in decalin at 135° C.

The bending reversal number was determined with an alternate bending tester from Frank GmbH on specimens 170 mm×15 mm in size at 500 alternate bendings/minute under a load of 150 g. The values stated are the mean of 5 measurements.

The mechanical properties of the films were investigated with a tensile tester 1445 from Zwick on specimens 15 mm wide over a clamped length of 100 mm. The tensile E modulus was determined in the elongation range from 0.3 to 0.5% at an elongation break of 10 mm/minute. The tear strength and elongation at break were determined at 100 mm/minute.

Example 1

Preparation of a polymer having the specific microstructure according to the invention.

A clean and dry 75 dm$^3$ polymerization reactor with a stirrer was flushed with nitrogen and then with ethylene, and 25,000 g of norbornene melt were introduced at 70° C. While stirring, the reactor then was maintained at a temperature of 70° C. and 15 bar of ethylene (increased pressure) were forced in.

Thereafter, 580 cm$^3$ of a toluene solution of methylaluminoxane (MAO solution, 10.1% by weight of methylaluminoxane of molecular weight 1300 g/mol according to cryoscopic determination) were metered into the reactor and the mixture was stirred at 70° C. for 15 minutes, the ethylene pressure being maintained at 15 bar by topping up. At the same time, about 3000 mg of rac-dimethylsilyl-bis-(1-indenyl)-zirconium dichloride (metallocene catalyst) were dissolved in 1000 ml of MAO solution (concentration and quality as above) and preactivated by allowing to stand for 15 minutes. Polymerization then was carried out at 70° C. for 220 minutes, while stirring (750 revolutions per minute), the ethylene pressure being maintained at 15 bar by topping up. The contents of the reactor then were drained rapidly into a stirred vessel into which 200 cm$^3$ of isopropanol had been initially introduced. The mixture was dispersed in 500 dm$^3$ of acetone and stirred for 10 minutes and the suspended polymeric solid was then filtered off.

The polymer which had been filtered off then was added to 200 dm$^3$ of a mixture of 2 parts of 3-normal hydrochloric acid and 1 part of ethanol, and this suspension was stirred for 2 hours. The polymer then was filtered off again, washed neutral with water and dried at 80° C. under 0.2 bar for 15 hours. Approximately 5100 g of product was obtained having a viscosity number (VN) of 90 cm$^3$/g and a glass transition temperature ($T_g$) of 147° C.

A $^{13}$C-NMR spectrum of a solution of the polymer in hexachlorobutadiene and tetrachloroethane-D2 was recorded using a 400 MHz NMR apparatus (Bruker AM 400). This spectrum is illustrated in FIG. 4. As can be seen from FIG. 4, the spectrum has the characteristic peaks at 28.0, 31.5, 33.1, 41.3, 42.2, 47.7 and 48.8 ppm.

Examples 2, 3 and 4

Preparation of other polymers having the specific microstructure according to the invention.

Polymers were prepared analogously to Example 1, isopropylene-(cyclopentadienyl)-(1-indenyl)-zirconium dichloride being used instead of rac-dimethylsilyl-bis(1-indenyl)-zirconium dichloride as the metallocene catalyst in Example 2, rac-Dimethylsilyl-bis-(1-indenyl)-zirconium dichloride was used in Example 3, and bis(1-indenyl)-zirconium dichloride was used in Example 4.

Table 1 summarizes the reaction conditions altered from Example 1.

The peaks in the $^{13}$C-NMR spectrum at 28.0, 31.5, 33.1, 41.3, 42.2, 47.7 and 48.8 ppm which are characteristic of the microstructure also are present here.

TABLE 1

| Example | Amount of norbornene (g) | Temperature (°C.) | Ethylene pressure (bar) | Amount of metallocene (mg) | Catalyst solution (ml) | Time (min) | Yield (g) | $T_g$ (°C.) | VN (cm$^3$/g) |
|---|---|---|---|---|---|---|---|---|---|
| 2 | 22000 | 70 | 6 | 150 | 1000 | 60 | 4700 | 179 | 75 |
| 3 | 22000 | 70 | 5 | 1000 | 1000 | 120 | 6200 | 178 | 89 |
| 4 | 22000 | 70 | 6 | 280 | 1000 | 60 | 3400 | 119 | 53 |

Example 5 and 6 (Comparison examples)

Preparation of polymers without the specific micro-structure according to the invention.

Polymers without the specific microstructure were prepared analogously to Example 1. Instead of rac-dimethylsilyl-bis-(1-indenyl)-zirconium dichloride, diphenylmethylene-(cyclopentadienyl)-(9-fluorenyl)-zirconium chloride (Example 5) and isopropylene(cyclopentadienyl)-(9-fluorenyl)-zirconium dichloride (Example 6) were used as metallocene catalysts. Table 2 summarizes the reaction conditions. The $^{13}$C-NMR spectrum of the polymer according to Example 5 is shown in FIG. 5. As can be seen from FIG. 5, the peaks at 28.0, 31.5, 33.1, 41.3, 42.2, 47.7 and 48.8 ppm that are characteristic of the specific microstructure of the present invention are absent.

TABLE 2

| Example | Amount of norbornene (g) | Temperature (°C.) | Ethylene pressure (bar) | Amount of metallocene (mg) | Catalyst solution (ml) | Time (min) | Yield (g) | $T_g$ (°C.) | VN (cm$^3$/g) |
|---|---|---|---|---|---|---|---|---|---|
| 5 | 22000 | 50 | 15 | 1000 | 1000 | 80 | 5500 | 144 | 163 |
| 6 | 22000 | 70 | 2.5 | 38 | 1000 | 120 | 4100 | 181 | 142 |

Example 7

The polymers from Examples 1 to 5 were pressed to sheets 1 mm thick in a sheet press at 250° C. Specimens 50 mm×10 mm in size were cut from these sheets. The temperature-dependence of the mechanical loss factor (tan δ)

was determined with a torsion pendulum apparatus (Zwick, cf. FIGS. 1, 2 and 3). The results are summarized in Table 3.

TABLE 3

| Example | $T_g$ | Specific microstructure | $T_g - 50°$ C. | tan δ at $T_g - 50°$ C. |
|---|---|---|---|---|
| 1 | 147 | yes | 97 | 0.022 |
| 2 | 179 | yes | 129 | 0.024 |
| 3 | 178 | yes | 128 | 0.021 |
| 5 | 145 | no | 95 | 0.010 |
| 6 | 181 | no | 131 | 0.011 |

Example 8

Production of a non-oriented film having the specific microstructure according to the invention.

The polymer from Example 1 was pressed in a sheet press at 250° C. to yield a film about 350 μm thick. The film was transparent and colorless and fractured when kinked once. The mechanical properties of the film were as follows:

| E modulus | 2.6 GPa |
|---|---|
| Tear strength | 50 MPa |
| Elongation at break | 3% |

Example 9 (Comparison example)

Production of a non-oriented film without the specific microstructure according to the invention.

The polymer from Example 5 was pressed in a sheet press at 250° C. to produce a film about 320 μm thick. The film was transparent and colorless and fractured when kinked once. The mechanical properties of the film were as follows:

| E modulus | 2.6 GPa |
|---|---|
| Tear strength | 30 MPa |
| Elongation at break | 2% |

Example 10

Production of an oriented film having the specific microstructure according to the invention.

The non-oriented film from Example 8 was stretched in a film stretching apparatus (Karo III from Brückner, Siegsdorf) at 180° C. longitudinally and transversely by in each case a factor of 1.8.

The mechanical properties of the film were as follows:

| E modulus | 3.2 GPa |
|---|---|
| Tear strength | 60 MPa |
| Elongation at break | 2% |
| Bending reversal number | 206 |

Example 11.

Production of a relatively highly oriented film having the specific microstructure according to the invention.

The non-oriented film from Example 8 was first stretched in the film stretching apparatus described in Example 10 at 180° C. at a stretching rate of about 100%/minute in the longitudinal and transverse direction by a factor of in each case 1.1. This stretched film then was further stretched at 125° C. at a stretching rate of 25%/minute in the longitudinal and transverse direction in each case by a factor of 2.0. The mechanical properties of the resulting film were as follows:

| E modulus | 3.2 GPa |
|---|---|
| Tear strength | 89 MPa |
| Elongation at break | 26% |
| Bending reversal number | 4000 |

Examples 12 and 13 (Comparison Example)

Production of oriented films without the specific microstructure according to the invention:

The non-oriented film from Example 9 was stretched analogously to Example 10 in each case in the longitudinal and transverse direction by various stretching factors (Examples 12 and 13). The mechanical properties of these films were as follows:

|  | Example 12 | Example 13 |
|---|---|---|
| Stretching factor (longitudinal and transverse; each) | 1.8 | 2.3 |
| E modulus | 3.6 | 3.6 GPa |
| Tear strength | 37 | 47 MPa |
| Elongation at break | 2 | 2% |
| Bending reversal number | 50 | 800 |

Example 14

Production of a thermoformed component by using a film made in accordance with the present invention.

The film from Example 7 was heated to about 180° C. in a vacuum thermoforming machine and then shaped to a conical dimensionally stable beaker in a cold thermoforming mold.

Example 15 (Comparison example)

The film from Example 9 was thermoformed analogously to Example 14. When the beaker was placed in an upright position, it tore at its kinking points.

While the invention has been described in detail above with reference to particularly preferred embodiments illustrated in the examples, those skilled in the art will appreciate that various modification may be made to the present invention without departing from the spirit and scope thereof.

What is claimed is:

1. An oriented film having at least one layer in which at least one of said layers comprises a cycloolefin copolymer, wherein the cycloolefin copolymer has a mechanical loss factor (tan δ) of ≧0.015 at 50° C. below the glass transition temperature.

2. A film as claimed in claim 1, wherein the $^{13}$C-NMR spectrum of the cycloolefin copolymer has a peak at 42.2 ppm.

3. A film as claimed in claim 2, wherein the $^{13}$C-NMR spectrum of the cycloolefin copolymer has peaks at 28.0, 31.5, 33.1, 41.3, 47.7 and 48.8 ppm.

4. A film as claimed in claim 1, wherein said film is a single-layer film.

5. A film as claimed in claim 1, wherein said film is uniaxially oriented.

6. A film as claimed in claims 1, wherein said film is biaxially oriented.

7. A film as claimed in claim 1, wherein the cycloolefin copolymer comprises recurring units of the formula (I) and (II), and optionally (III) and/or (IV) and/or (V):

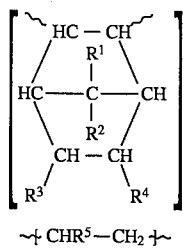 (I)

$-\!\!\!+\!CHR^5-CH_2\!+\!\!\!-$ (II)

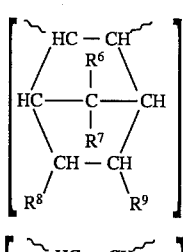 (III)

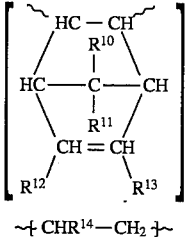 (IV)

$-\!\!\!+\!CHR^{14}-CH_2\!+\!\!\!-$ (V)

in which (III) is not identical to (I), $R^1$ to $R^5$ are the same or different and may be H, aryl, $C_1$–$C_{10}$-alkyl, $C_3$–$C_{10}$-cycloalkyl and in which $R^6$ to $R^{14}$ are the same or different and may have the meaning of $R^1$ to $R^5$, or may be $C_2$–$C_{10}$–alkylene or $C_3$–$C_{10}$-cycloalkenyl, and in which the radical pairs $R^6/R^7$, $R^8/R^9$, $R^{10}/R^{11}$ and/or $R^{12}/R^{13}$ in each case may be bonded to one another and, together with the carbon atoms to which they are bonded, may be a $C_4$–$C_{10}$-cycloalkyl or $C_4$–$C_{10}$-cycloalkenyl radical, which in turn may be bridged by a —$C(R^1,R^2)$-radical, in which $R^1$ and $R^2$ have the meanings given above for $R^1$ to $R^5$.

8. A film as claimed in claim 7, wherein $R^1$, $R^2$, $R^3$, $R^4$ and $R^5$ are hydrogen.

9. A film as claimed in claim 1, wherein the cycloolefin copolymer has been prepared using a metallocene catalyst system.

10. A film as claimed in claim 1, wherein the glass transition temperature of the cycloolefin copolymer is between 50° and 250° C.

11. A film as claimed in claim 10, wherein the glass transition temperature of the cycloolefin copolymer is between 80° and 200° C.

12. A film as claimed in claim 1, wherein the cycloolefin copolymer has a viscosity number of between 25 and 500 ml/g.

13. A film as claimed in claim 12, wherein the cycloolefin copolymer has a viscosity number of between 35 and 200 ml/g.

14. A film as claimed in claim 1, wherein said film further comprises 0 to 2% by weight of inert particles, based on the weight of the film.

15. A film as claimed in claim 9, wherein said metallocene catalyst system comprises at least rac-dimethylsilyl-bis-(1-indenyl)-zirconium dichloride or isopropylene-(cyclopentadienyl)-(1-indenyl)-zirconium dichloride.

16. A capacitor dielectric comprising a film as claimed in claim 1.

17. An electrical insulation comprising a film as claimed in claim 1.

18. A thermoformed component comprising a film as claimed in claim 1.

19. A display window for LED cells comprising a film as claimed in claim 1.

20. A method of making a film as claimed in claim 1, comprising the steps of:

(a) polymerizing a cycloolefin and an olefin in the presence of a metallocene catalyst that comprises a rac-dimethylsilyl-bis-(1-indenyl)-zirconium dichloride or isopropylene-(cyclopentadienyl)-(1-indenyl)-zirconiumdichloride to form a cycloolefin copolymer;

(b) separating the cycloolefin copolymer; and (c) forming a film from said cycloolefin copolymer.

* * * * *